UNITED STATES PATENT OFFICE.

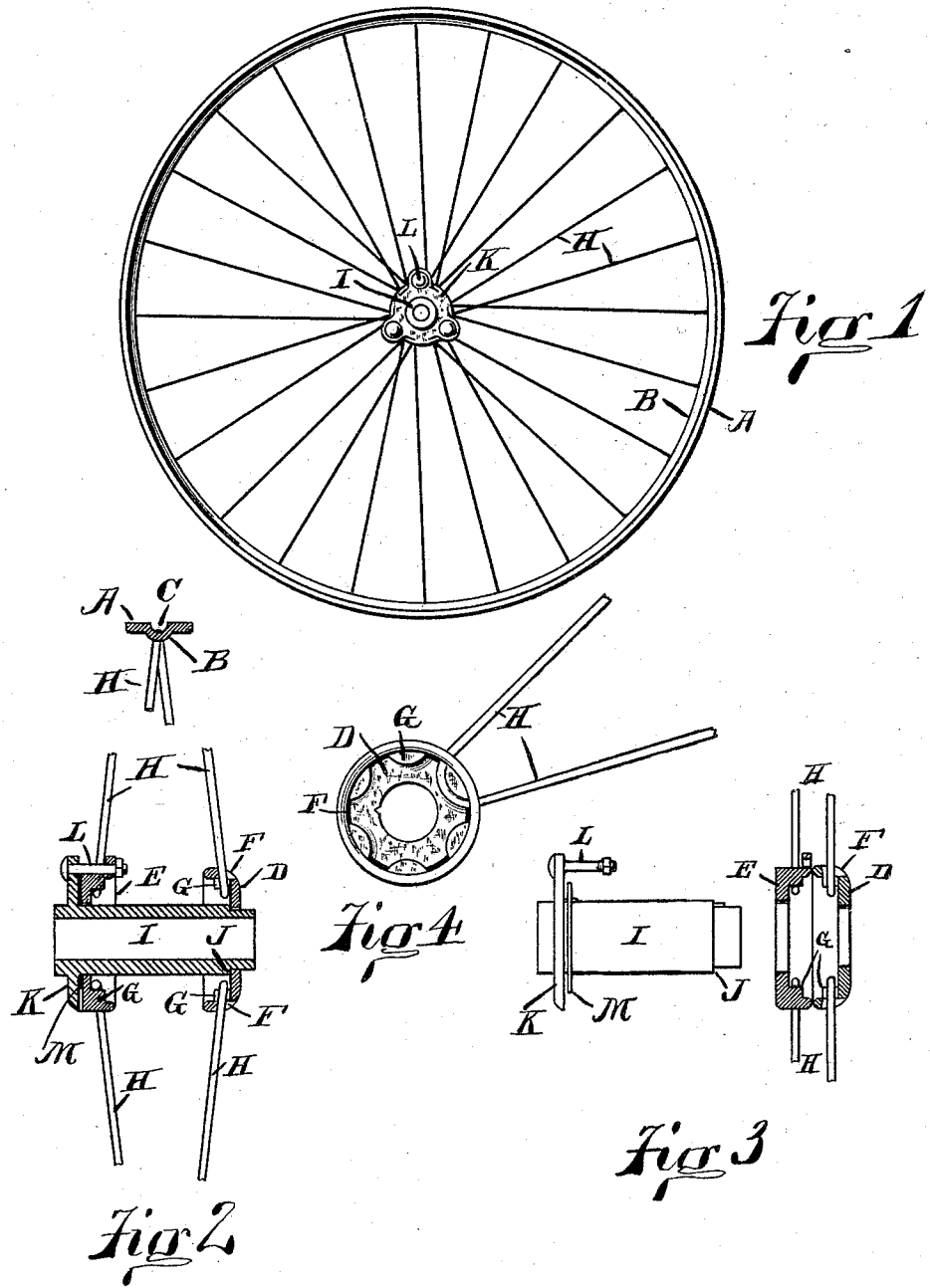

ROBERT S. CARR, OF HAMILTON, OHIO.

VEHICLE-WHEEL.

SPECIFICATION forming part of Letters Patent No. 319,452, dated June 9, 1885.

Application filed October 4, 1884. (No model.)

*To all whom it may concern:*

Be it known that I, ROBERT S. CARR, of Hamilton, Butler county, Ohio, have invented certain new and useful Improvements in Wheels, of which the following is a specification.

This invention relates to improvements in that class of wheels formed with wire spokes, and commonly known as "suspension-wheels." The improvements will be readily understood from the following description, taken in connection with the accompanying drawings, in which—

Figure 1 is a face view of a wheel embodying my improvements; Fig. 2, a diametrical section of the same, with the hub-flanges in normal position; Fig. 3, a diametrical section of the hub-flanges in knockdown position and with the hub-sleeve pulled out; and Fig. 4 a view of the inner face of one of the hub-flanges.

In the drawings, A represents the tire of the wheel; B, a re-enforcing-rib formed on the inner surface of the tire; C, a peripheral groove in the tire; D, one of the hub-flanges; E, the other hub-flange; F, openings in the periphery of the hub-flanges, to admit the spoke-wires; G, segmental lugs within the hub-flanges, around which the spoke-wires engage; H, the spoke-wires, each wire forming two spokes and having both ends riveted to the tire; I, the hub-sleeve; J, a shoulder near one end of the hub-sleeve; K, a flange formed near the other end of the hub-sleeve; L, bolts uniting the sleeve-flange K to the hub-flange E; M, a washer interposed between the sleeve-flange and the hub-flange.

In packing agricultural implements into railroad-cars it is found that ordinary wheels of iron or wood construction seriously interfere with compact loading, each wheel having virtually a thickness equal to the length of its hub. In iron wheels of the suspension type the wire spokes generally have considerable spread at the hub, and this also interferes, to some extent, with the close packing of the wheels in shipping. In my present construction I am enabled in shipping to remove the hub-sleeve and collapse the spread of the spoke-wires, thus forming a knockdown wheel occupying a little, if any, more space than its tire. If the spoke-wires of suspension-wheels are riveted at the outside of the tire, the riveted projections detract from the smooth exterior of the wheel, and wear is liable to detract from the strength of the riveting. As seen by a section of the tire in Fig. 2, the riveting of the spoke-wires is seated within the peripheral groove of the tire, whereby undesired projections are avoided, and whereby the riveting is not liable to become removed by wear. The spoke-wires are riveted at each end to the tire, and their central bends engage around the segmental lugs formed upon the hub-flanges, as clearly indicated in Fig. 4. When the wheel is in normal condition, as indicated in Fig. 2, the hub-sleeve is firmly bolted to the hub-flange E, and the spread of the wheel is produced by the shoulder J of the hub-sleeve forcing outward the hub-flange D. This forms a rigid hub structure, and brings all the spoke-wires under equal strain. The hub-flanges may, if desired, be secured against any rotation on the hub-sleeve by keys or feathers. Should the general spoke structure become slackened in course of time by slight stretching of the wires, the washer M may be removed, whereby the hub-flange E may be drawn farther from the hub-flange D, and the spread of the spoke-wires increased, and the slack of the spoke-wires taken up. A washer inserted between the hub-flange D and the shoulder upon the hub-sleeve would serve the same purpose; but in practice I prefer the former arrangement, as it provides a new wheel with all of the facilities for increased straining, while in the latter arrangement the restraining of the wheel would call for the procurement of a suitable washer.

When the wheel is to be knocked down for shipment, the bolts L are removed and the hub-sleeve withdrawn, as indicated in Fig. 3. This permits the spoke-wires to collapse and the hub-flanges to come together, thus producing a structure thin at the center.

A knowledge of the state of the art will aid in comprehending more fully the scope and limitation of my invention.

Wheels of the class under consideration have been constructed with the central bends of the two sets of spoke-wires attached to two independent hub-flanges, and these hub-flanges have been arranged to be adjusted to and from each other for the purpose of adjusting the tension of the spokes, as may be understood from the following references:

In 1868 a wheel was patented by Buzzell, in which the two hub-flanges were screwed upon the threaded ends of the hub-tube. After the wheel was once put together this hub-tube could not be removed without taking the wheel entirely to pieces. The wheel possesses no collapsible qualities.

In 1839 a wheel was patented by Tolles, in which a hub-tube was removable from the hub-flanges; but such removal did not permit the hub-flanges to approach each other and collapse the wheel. The wheel did not possess any collapsible qualities.

In 1884 a wheel was patented by Williams, (No. 305,769,) in which the two hub-flanges were independent, and capable of moving inward the same as the hub-flanges of my wheel. From the outer faces of the hub-flanges pins projected, and the central bends of the spoke-wires engaged around these pins. The hub was screwed through one hub-flange and had an abutting bearing in the other hub-flange. Thus by screwing the hub inward it would force the hub-flanges apart and put the spokes under tension, and when the hub was screwed outward the hub-flanges could be brought closely together and the hub removed. In this structure the inward movement of the hub-flanges did not result in a proper inward movement of the spoke-wires. The spoke-wires, being simply bends around the upwardly-bent pins referred to, would disengage themselves from these pins, and the hub-flanges would consequently be entirely detached from the wheel, and would fall away. The re-expanding of the wheel would require a replacement of the hub-flanges and a replacement of all of the spoke-bends. This structure presented a wheel capable of what might be called "total collapse;" but it did not possess that peculiarity of structure which enabled the wheel, when collapsed, to be put into working condition by the simple insertion of its hub from one side of the wheel.

As the main object of my invention is to produce a saving in freight-charges by enabling the wheels to be packed closely in a car, such object would be entirely defeated by a structure which would require an amount of labor in re-expanding the wheel which in cost would overbalance the saving in freight-charges.

Williams patented a wheel in 1884, (Patent No. 305,727,) in which the separate hub-flanges were spread apart by nuts disposed between the hub-flanges, the nuts working upon the threaded hub, the bends of the spoke-wires seated in notches in rings forming the hub-flanges, and were held into these notches by conical hubs inserted from the inside and projecting outward. These conical hubs and the nuts by which the hub-flanges were adjusted required to be removed from within the wheel, and upon their removal the spoke-wires were at liberty to disengage from the notches referred to. This wheel would collapse; but the operation of restoring it to an expanded condition required a character of skilled labor more pertinent to the manufacture of wheels than to the mere adjusting of the same, and the cost of this labor would far overbalance any saving in freight-charges effected by the collapsibility. In my wheel the spoke-wires are inseparably attached to the hub-flanges, and therefore no replacement of the spoke-wires is necessary when a collapsed wheel is to be expanded. The hub is inserted from one side of the wheel, and the removal of this hub leaves the hub-flanges and spokes in unimpaired relative position, ready for immediate proper action upon the insertion of the hub.

I claim as my invention—

1. A tire, two independent hub-flanges, two sets of spoke-wires attached inseparably to the tire and to the hub-flanges, and a hub-sleeve passing through one of the hub-flanges and against the other hub-flange, constructed and combined, substantially as set forth, for the purpose of enabling the wheel to be collapsed without disturbing the relation of the spoke-wires and the hub-flanges.

2. In a metallic wheel, the combination, substantially as set forth, of the tire A, the spoke-wires H, having their ends secured to the tire and provided with central bends, the separate hub-flanges D and E, engaged by the bends of the spoke-wires, and the hub-sleeve I, having the shoulder J, and flange K, and the bolts L, the whole arranged to form a wheel capable of collapsing when the hub-sleeve is withdrawn.

ROBERT S. CARR.

Witnesses:
J. W. SEE,
W. A. SEWARD.